(12) United States Patent
Jefferies et al.

(10) Patent No.: US 8,619,399 B2
(45) Date of Patent: Dec. 31, 2013

(54) COMPOSITION OF A DESIRED TRIP CURVE

(75) Inventors: Kevin Jefferies, Raleigh, NC (US);
Timothy B. Phillips, Raleigh, NC (US);
Benjamin W. Edwards, Knightdale, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 196 days.

(21) Appl. No.: 13/135,282

(22) Filed: Jun. 30, 2011

(65) Prior Publication Data
US 2013/0003240 A1    Jan. 3, 2013

(51) Int. Cl.
*H02H 3/00* (2006.01)
(52) U.S. Cl.
USPC .......................................................... 361/87
(58) Field of Classification Search
USPC .................................. 361/115, 87, 93.1, 93.2
See application file for complete search history.

(56) References Cited

U.S. PATENT DOCUMENTS

| | | | |
|---|---|---|---|
| 4,345,292 A | 8/1982 | Jaeschke et al. | |
| 5,418,677 A | 5/1995 | Engel | |
| 5,541,561 A * | 7/1996 | Grunert et al. | 335/132 |
| 5,818,674 A * | 10/1998 | Zuzuly | 361/78 |
| 6,125,024 A * | 9/2000 | LeComte et al. | 361/104 |
| 7,369,389 B2 * | 5/2008 | Vicente et al. | 361/115 |
| 7,463,462 B2 * | 12/2008 | Plemmons et al. | 361/25 |

* cited by examiner

*Primary Examiner* — Rexford Barnie
*Assistant Examiner* — Rasem Mourad
(74) *Attorney, Agent, or Firm* — Locke Lord LLP (57) ABSTRACT

A method and apparatus for composing a desirable trip curve, such as an $I^2*t$ trip curve, for an electrical protective device from at least one less desirable trip curve, such as an I*t trip curve. The method is accomplished by defining a selected parameter of the desirable overload trip curve and defining the selected parameter as a function of one or more monitored input values, such as current, trip class or phase unbalance, and modulating the selected defined parameter value between a maximum boundary trip curve and a minimum boundary trip curve. The modulated parameter is used to adjust the less desirable trip curve such that it has the characteristics of the desired trip curve. The method is implemented by one or more electrical circuits (filter circuits) representing the less desirable trip curve(s) and composing an output signal representing the desirable trip curve by modulating between the one or more electrical circuits.

22 Claims, 5 Drawing Sheets

Fig. 9

# COMPOSITION OF A DESIRED TRIP CURVE

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to electrical protection devices and particularly to a method for developing a desirable trip curve from at least one less desirable trip curve.

BACKGROUND OF THE INVENTION

Many electrical protection devices employ various means to obtain trip curves that define the point at which current to the protected device will be interrupted. Some electrical protective devices use an $I^2*t$ trip curve, which is preferred over an $I*t$ trip curve because it provides a better model of the protected circuit or device. Thermal overload relays employ a resistive heating element to model electrical heating in a protected device. This resistive heating inherently results in overload trip curves with $I^2*t$ characteristics. The $I^2*t$ characteristic is especially desirable in motor protective devices, such as solid state overload relays (SSOLRs), because it can closely model $I^2*R$ motor winding heating. Typically SSOLRs model motor heating in either analog or digital electronics, by performing some sort of signal processing to convert signals representing line currents into input for a thermal model. Electronic thermal modeling introduces an obstacle to achieving $I^2*t$ overload curve characteristics by requiring a squaring operation during the processing of these signals. There are several electronic solutions that achieve an $I^2*t$ trip curve characteristic. However, each solution has its own inherent advantages and disadvantages and presently all require a significant power budget that limits their application to only those overload protection devices that can provide sufficient power for the solution to work.

In self powered overload protection devices, a low power budget presents a very large obstacle for achieving the desired trip curves, such as one having the $I^2*t$ trip curve characteristics. This obstacle is significant enough that self powered overload protection devices with the desirable $I^2*t$ overload trip curve are relatively unknown. The less desirable $I*t$ trip curve is employed in all but the most expensive self powered overload protection devices. Therefore, a method for composing desirable trip curves, such as the $I^2*t$ trip curve, using very little power and in a less expensive manner would be desirable.

SUMMARY OF THE INVENTION

The present invention provides a method of composing desirable trip curves, such as the $I^2*t$ trip curve, from less desirable but easily obtained trip curves, such as the $I*t$ trip curve. The present invention composes desirable trip curves in an energy efficient manner that can be used in any device, and is particularly useful in devices having a low power budget, such as self powered solid state overload protection devices. The desired trip curves are composed by defining a parameter of the desired trip curve as a function of an input value of the less desirable trip curve and modulating between boundary curves implementing the necessary range of adjustment for the selected parameter. The invention describes dynamic filters for interpolating between boundary trip curves to achieve the desired trip curve. The dynamic filter can be embodied in analog circuits as described herein, and in corresponding digital implementations. Additionally, this invention includes provisions for dynamic adjustment of the desired trip curve based on operating conditions, such as unbalance, distinct regions of operation, or user selected regions of operation.

BRIEF DESCRIPTION OF THE DRAWINGS

The features of the invention will be more clearly understood from the following detailed description of the invention read together with the drawings in which.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION

For the purpose of the following description of the present invention, the following terms will be defined as set forth below.

A trip curve is defined as a plot of time vs. current which defines the protective behavior of an overload protective device such as an overload relay. The limits of the trip curve are established by standards such as UL508 and IEC 60947-4-1, which specify an "ultimate trip point" at which the protective device must trip and a "locked rotor" current at which the protective device must trip within some time limit. The area of interest of a trip curve, for the following discussion, lies between these two points.

A less desirable trip curve is defined herein as a trip curve that can generally be achieved using state of the art technology but has characteristics that are not ideal for optimum protection of an electrical circuit or device. For example, the $I*t$ trip curve can be obtained using simple, inexpensive, low power budget implementations. However, its use generally causes protective devices to be over protective for slightly overloaded electrical circuits and devices, especially motors, thus causing nuisance tripping.

A desirable trip curve is defined herein as a trip curve in which one or more characteristics of a less desirable trip curve have been adjusted to provide a more accurate or desirable behavior for an overload protective device. For example, the desirable $I^2*t$ trip curve provides a more accurate model of the heating in a circuit or motor than the less desirable $I*t$ trip curve.

The maximum and minimum boundary trip curves are defined herein as less desirable trip curves that define the maximum and minimum levels (time vs. current) between the ultimate trip point and locked rotor current at which the protective device must trip. Therefore, the maximum boundary trip curve generally under protects the circuit or device (does not trip soon enough) while the minimum boundary generally over protects the circuit or device (trips too soon).

The maximum value of a selected parameter is defined herein as a value of one or more selected parameters of the desirable trip curve parameters, such as $I_R$, $\tau$ and P, that will produce a maximum boundary trip curve when processed according to Equation 1, as described herein.

The minimum value of a selected parameter is defined herein as a value of a selected parameter of the desirable trip curve parameters, such as $I_R$, $\tau$ and P, that will produce a minimum boundary trip curve when processed according to Equation 1, as described herein.

The dynamic modulation of one or more electrical circuits is defined herein as the selecting of one electrical circuit from one or more available electrical circuits, each circuit representing a less desirable trip curve, to be connected to an output circuit for a determined duty cycle. The resulting modulated output signal represents the desirable trip curve. The selecting of the electrical circuit for connection and determining the duty cycle of that connection is accomplished by a switch device controller, such as a microprocessor.

Duty cycle is defined herein as the amount of time, determined by a switching device controller, that the selected electrical circuit is connected to the input of the switching device.

A self powered device is defined herein as a device that derives its operating power from the same means used to monitor the protected electrical circuit or device. The monitoring means is usually a current transformer, which provides a minimal amount of power.

A power budget is defined as the amount of power produced by the monitoring means for operating all of the various circuits of the protective device. Protective devices that have separate power supplies have sufficient power available to run all circuits in the protective device (a large power budget). Self powered protective devices have only that limited amount of power, such as provided by a current transformer, used for monitoring current provided to the protected device (a low power budget). After the power required for basic operation of the protective device has been taken from the total amount of derived operating power, very little power remains for the calculating and processing of algorithms needed to implement the desired trip curve. Therefore, any circuitry other than that required for basic operation of the protective device must be able to operate within that very small part of the power budget that remains after the basic protective device operations have been satisfied.

The trip curve of an electrical protection device implementing "inverse time" protection is defined by coordinates in current and time, and a method of modulating between them. Applicable standards such as IEC 60947-4-1 and UL 508 define multiple points or regions where the overload protection device must not trip, or must trip within some time limits. The requirements of the standards are reduced through analysis to create parameters for ideal curves; e.g., a nominal current level or trip time may be chosen from a specified acceptable range. The "ultimate trip" is one such trip curve parameter. It divides the current axis into two regions: one where the overload protection device must not trip on an overload condition, and one in which it must trip. This can be represented as a trip time approaching infinity at the ultimate trip current. The "Locked rotor" is another typical trip curve parameter; it gives an ideal trip time at a certain current. These two parameters are generally the end points between which trip curves are defined. Standards, such as those mentioned above, do not specify a method of interpolating between these points. Trip curves are an attempt to model motor heating as realistically as possible given the limited data and resources available to the overload protection device.

Figure 1:
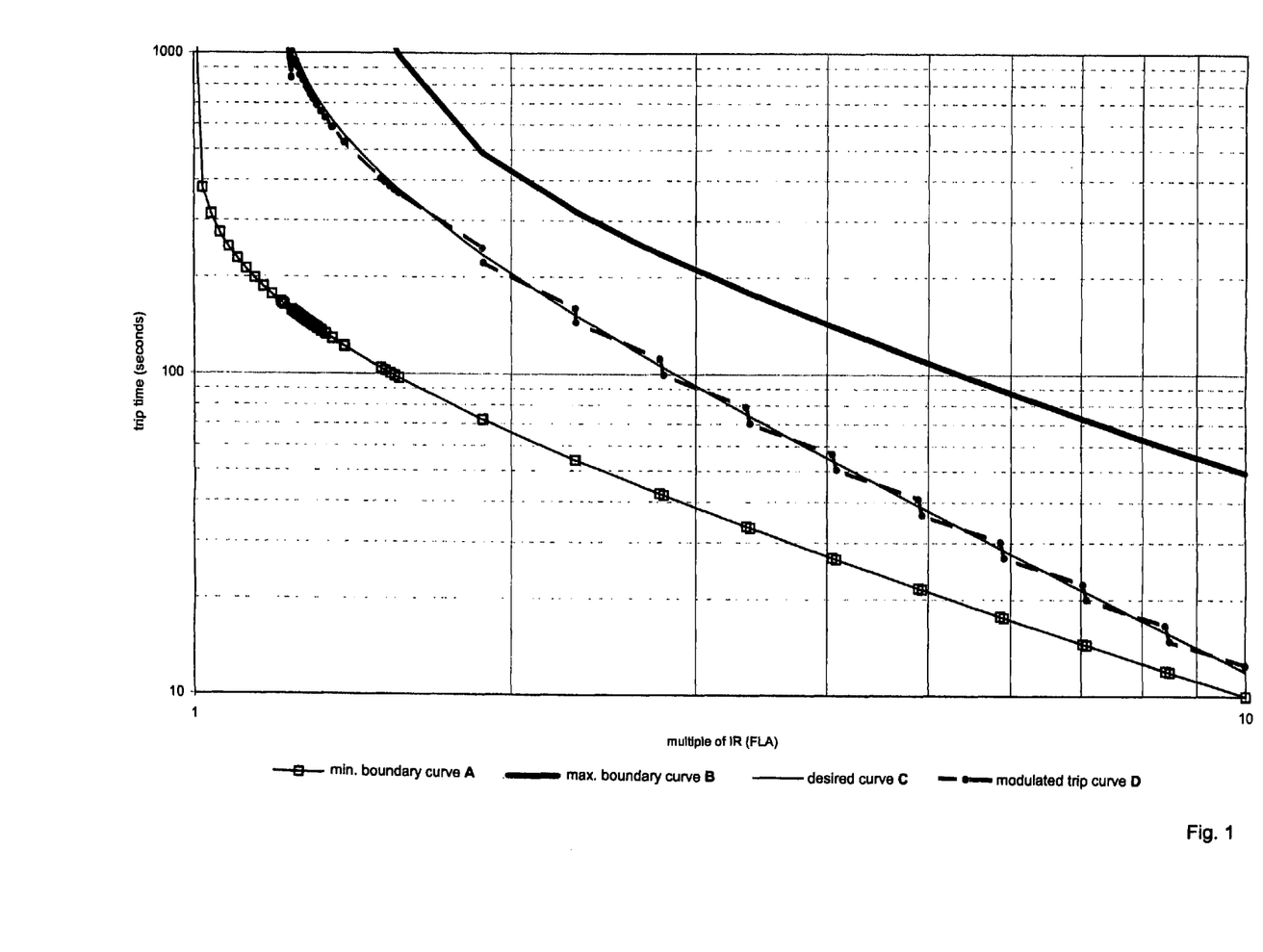
FIG. 1 illustrates graphically the time and current relationship of the minimum boundary trip curve ($I*t$ trip curve), maximum boundary trip curve, desirable $I^2*t$ trip curve and a composed desirable $I^2*t$ trip curve in accordance with the present invention.

Trip curves attempt to model heating in the protected electrical circuit or device due to $I^2*R$ losses in the conductors, the result of which is ideally an $I^2*t$ trip curve. $I^2*t$ trip curves interpolate between the ultimate trip and locked rotor coordinates using a squaring function: trip time at an applied current is determined by the square of the ratio of the applied current to the ultimate trip current. $I*t$ trip curves use a simpler interpolation that uses the same ratio, without squaring. The following equation generalizes curves A, B and C of FIG. 1.

$$\text{trip time} = -\tau \times \ln\left[1 - \left(\frac{I_R}{I}\right)^P\right] \quad \text{Equation 1}$$

In this equation $I_R$ is the ultimate trip current or full load current (amps) (FLA), I is the applied current, P is the "order" of the trip curve (e.g., 1 for $I*t$ or 2 for $I^2*t$), and $\tau$ is a constant. With specified ultimate trip and locked rotor parameters, the equation can be solved for $\tau$ as a function of P.

Qualitative analysis reveals how these parameters affect the trip curve. $\tau$ is a multiplicand of the trip time, it affects only the vertical scale of the curve. As $I_R$ is the lower bound of the trip curve, I is greater than or equal to $I_R$; therefore the ratio $I_R/I$, and the operand of the logarithm, is in the range of 0 to 1. As I increases above $I_R$ the logarithm operand approaches 1, so the result of the logarithm approaches 0. As I approaches $I_R$ the logarithm operand approaches 0, so the result of the logarithm approaches infinity. $I_R$ affects the horizontal scale of the trip curve. Maintaining constant I and $\tau$ as P is increased from 1, the operand to the logarithm increases; therefore, increasing P reduces trip time. Maintaining a constant trip time, $I_R$, and $\tau$, thereby requiring a constant operand to the logarithm, increasing P requires reducing I. Therefore, P affects the horizontal scale and shape of the curve. To generalize, $\tau$ and $I_R$ affect the vertical and horizontal scale of the curve, while P affects the curve shape.

Standard electrical protection device trip curves of different orders P meet at the locked rotor parameter, and maintain the same ultimate trip parameter; in other words, they are defined by the same $I_R$, with different values of P. Therefore, maintaining the locked rotor current-time coordinate between these curves requires changing $\tau$. As qualitative analysis shows, increasing P decreases trip time without adjustment of other parameters, therefore maintaining the locked rotor coordinate requires increasing $\tau$ while increasing P. For I between $I_R$ and locked rotor, the curve with higher P, and $\tau$, remains above the lower P curve. In practical terms, the result is that standard electrical protective device trip curves of higher order trip slower than those of lower order for currents between ultimate trip and locked rotor.

Generally, trip curves of different orders can be designed to meet at any current-time coordinate by adjusting one or both of $\tau$ or $I_R$. Continuing with the example of standard electrical protection device trip curves, these curves maintain the same $I_R$, leaving τ as the parameter for adjustment. With τ defined as a function of I, two curves with different P, and the same $I_R$ can be made identical. With a given range of I, such as between the ultimate trip and locked rotor parameters for less standard overload protection device trip curves, the necessary range of adjustment of τ to equate two curves can be determined. The upper and lower limits of τ specify maximum and minimum boundary trip curves; interpolating between these boundary curves achieves the desired trip curve.

Figure 2:
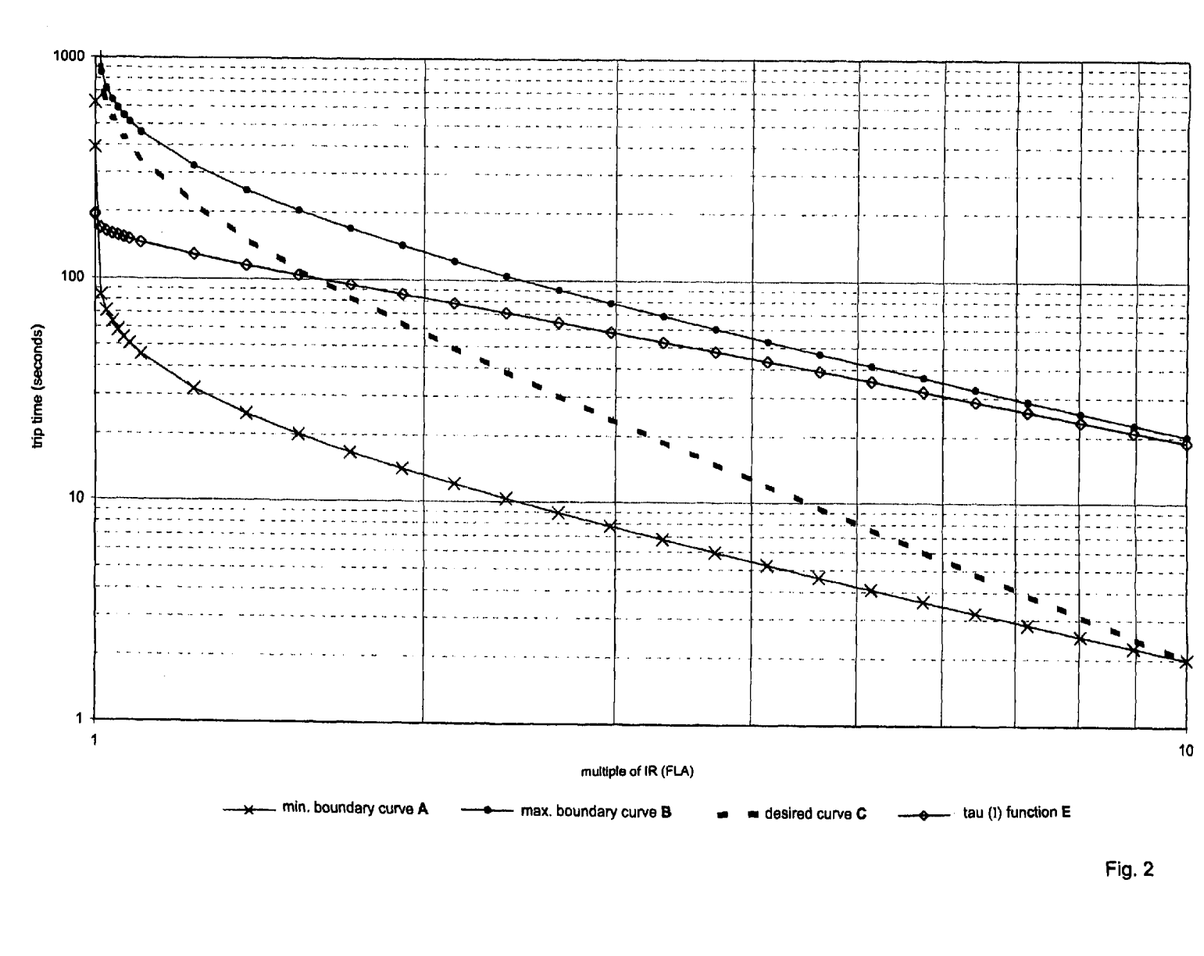
FIG. 2 illustrates the trip curves of FIG. 1 and the tau ($\tau$) function used to modify the $I*t$ trip curve.

FIG. 2 graphically illustrates a desirable $I^2$*t trip curve C having $I_R$=1 and P=2 and a trip time (I=10*$I_R$)=2 seconds, a less desirable I*t trip curve A having $I_R$=1 and P=1 and a trip time (I=10*$I_R$)=2 seconds (minimum boundary curve), and the less desirable maximum boundary curve B having $I_R$=1 and P=1 and a trip time (I=10*$I_R$)=20 seconds. Using the teaching of the present invention τ(I) can be defined as a function of I and used to adjust a less desirable I*t curve (defined with P=1) such that it has the characteristics of the desirable $I^2$*t curve C (defined with P=2). The τ(I) function to compose a desirable $I^2$*t curve from a less desirable I*t curve is given by Equation 2 below.

$$\tau(I) = \frac{\text{trip time}_C(I)}{\ln\left[1 - \left(\frac{I_R}{I}\right)^1\right]} \quad \text{Equation 2}$$

The minimum value of τ(I), which defines the minimum boundary curve A, is found at the maximum value of I for which the trip curves are defined, in this example this is the locked rotor current. In this example the minimum boundary curve is coincident with the I*t curve, which is also shown as curve A in FIG. 2. The maximum value of τ(I), which defines the maximum boundary curve B in FIG. 2, is determined as I approaches the minimum value, which is $I_R$. The desired trip curve C lies between boundary curves A and B. FIG. 2 shows two such trip curves A and B, and the associated τ(I) function curve E, from equation 2 above, necessary to make a less desirable I*t curve A equal to desirable curve C.

Varying τ(I) can compensate for the difference in the operand to the logarithm functions between the trip curve equations for trip curves with the same value of $I_R$, but different values of P. The boundary curves A and B, established by the minimum and maximum values of τ(I) are, by definition, proportional to any curve with the same values of P and $I_R$. For any value of I, the trip times between and including these curves represent the range of possible trip times if τ(I) is varied within the defined range. Trip times within the range defined by the minimum and maximum values of τ(I) can be determined by Equation 3 below.

$$\text{trip time}(I) = \tau(I) \times \ln\left(1 - \frac{I_R}{I}\right) \quad \text{Equation 3}$$

Figure 3:
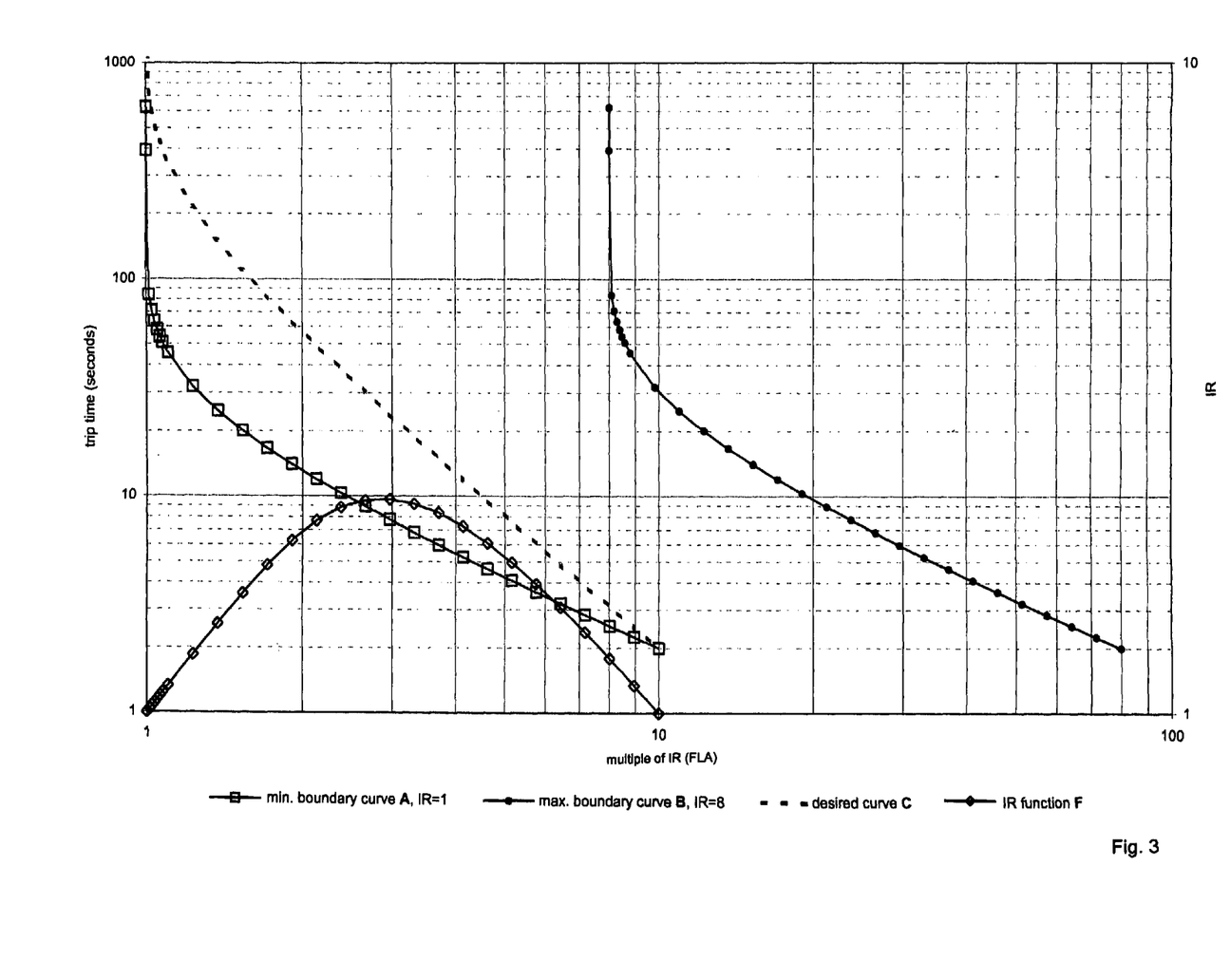
FIG. 3 illustrates minimum and maximum boundary trip curves and the $I_R$ function used to modify the $I*t$ trip curve.

Similarly, $I_R$ can be defined as a function of I to achieve a trip curve that modulates between two boundary curves with different values of $I_R$ and the same value of τ. FIG. 3 shows the $I_R$(I) function necessary to make a less desirable I*t curve equal to the desirable $I^2$*t curve C, as in the previous example. Adjusting $I_R$(I) interpolates horizontally between the boundary curves A and B, which are by definition horizontally scaled versions of any curve with the same values of P and τ. Equation 4 below defines $I_R$(I) as a function of I to make curves A and C equal.

$$I_R(I) = I \times \left(1 - e^{\frac{\text{trip time}(I)}{-\tau}}\right) \quad \text{Equation 4}$$

This gives the range of $I_R$(I) necessary to make a less desirable I*t curve equal curve C, which establishes the minimum and maximum boundary curves, A and B respectively, defined by $I_{Rmin}$ and $I_{Rmax}$. For any trip time, the value of I at which the desirable trip curve C intersects this trip time is controlled by adjusting $I_R$(I). At any value of I, every trip time between the minimum and maximum boundary curves is achievable with some value of $I_R$(I), as derived in Equation 5 below.

$$\text{trip time}(I) = -\tau \times \ln\left(1 - \frac{I_R(I)}{I}\right) \quad \text{Equation 5}$$

A trip curve can also be defined with parameters $I_R$ and τ both as functions of I. This combines the two methods of interpolation, allowing the resulting curve to be scaled horizontally and vertically between the boundary curves A and B, which are established by the minimum and maximum values of $I_R$(I) and τ(I) at each value of I, as defined in Equation 6 below.

$$\text{trip time}(I) = -\tau(I) \times \ln\left(1 - \frac{I_R(I)}{I}\right) \quad \text{Equation 6}$$

In summary, this analysis shows that defining trip curve parameters as functions of I, in these examples τ, $I_R$, or both, can adjust a less desirable trip curve defined by one value of P to equal a desirable trip curve C defined by another value of P. The following section explains how this principle can be applied in an SSOLR, specifically to adjust an I*t trip curve A to match an $I^2$*t curve C.

A typical electrical protection device implements a thermal model of the protected circuit or device using a RC filter, a digital approximation, or some combination thereof. These electrical protection devices have historically increased in cost as the thermal models incorporated progress from analog to digital. This is mainly due to the cost and current consumption barriers faced by lower end (low cost self powered) electrical protection devices, especially SSOLRs, and the acceptance of more basic protection functions from low end products. As the present invention focuses on improving the thermal modeling in lower end electrical protection devices, which have conventionally implemented analog thermal models, the embodiments discussed herein focus mainly on analog implementations. However, it is to be understood that analogous digital filters exist, which are increasingly possible to implement while adhering to the constraints of the low end electrical protection devices, due to the expanding array of inexpensive, powerful, low power consumption microcontrollers. For each analog embodiment covered herein, there exists a digital implementation.

Figure 4:
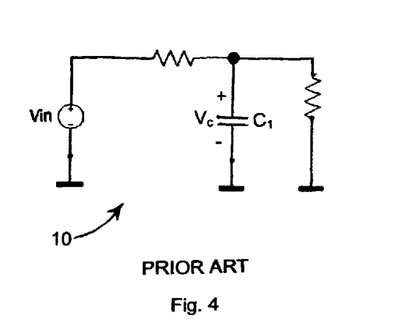
FIG. 4 illustrates a filter circuit representing the less desirable $I*t$ trip curve.

In a typical analog thermal model, a voltage $V_{in}$ representing the average of the currents applied to the circuit or device is applied to a RC filter circuit. When the applied currents are above ultimate trip point, the circuit is designed such that the capacitor voltage $V_c$ crosses a threshold, causing a trip. The time constant of the circuit is determined by the locked rotor parameter of the desired trip curve. FIG. 4 illustrates a RC filter circuit 10 that implements the less desirable I*t thermal model of trip curve A.

The most obvious method to achieve the desirable $I^2*t$ characteristics with this model is to make the voltage applied to the circuit proportional to $I^2$ rather than I, and adjust the value of τ accordingly. This is the conventional method of implementation of desirable $I^2*t$ curves in higher end SSOLRs. However, this method adds circuitry and/or algorithms that exceed the self powered SSOLR constraints of low cost and low power consumption. As discussed above with respect to FIG. 1, the variation of other parameters of a less desirable $I*t$ trip curve can compose the desirable $I^2*t$ trip curve C by modulating between boundary curves A and B. The method and apparatus disclosed herein for modulating between RC filter circuits representing the minimum and maximum boundary curves, A and B respectively, does not exceed the power and/or cost constraints of a self powered SSOLR.

Figure 5:
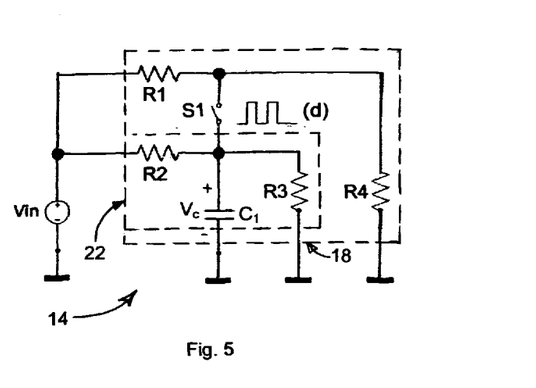
FIGS. 5-8 illustrates filter circuits representing less desirable boundary curves that are modulated in accordance with the present invention to compose desirable trip curves.

FIG. 5 illustrates a filter circuit, generally indicated by reference number 14, implementing control over the horizontal and vertical scaling of a composed desirable trip curve such as modulated trip curve D of FIG. 1. Modulated trip curve D is composed by modulation between the minimum boundary curve A and maximum boundary curve B of FIG. 1, as described in the theoretical example above. In this implementation, modulation is achieved by selectively switching between a first RC circuit 18 representing the minimum boundary curve A and a second RC circuit 22 representing the maximum boundary curve B, according to a modulation variable, d. The modulation variable d represents the duty cycle of the first and second RC circuits, 18 and 22 respectively, which determines when they are electrically present in the circuit 14. Modulation of the first and second RC circuits, 18 and 22 respectively, is achieved by opening and closing a switching device S1. For d=0 switch S1 is always open, the achieved values of τ and $I_{Reff}(d)$ are equal to the value for the slower trip time maximum boundary curve B, and the achieved curve is equal to the slower maximum boundary curve B. For d=1, the switch S1 is always closed, the achieved values of τ and $I_{Reff}(d)$ are equal to the value for the faster trip time minimum boundary curve A, and the achieved curve is equal to the fast minimum boundary curve A. For d between 0 and 1, the achieved curve is somewhere in between the maximum and minimum boundary curves, A and B respectively, such as the modulated desirable trip curve D in FIG. 1. The achieved trip time and value for τ, denoted $\tau_{eff}$, can be obtained by using Equation 7 below.

$$\text{trip time}(d, I) = -\tau_{eff}(d) \times \ln\left(1 - \frac{I_{Reff}(d)}{I}\right),$$

$$\tau_{eff}(d) = \left(\frac{1-d}{\tau_{d=0}} - \frac{d}{\tau_{d=1}}\right)^{-1}$$

$$I_{Reff}(d) = \frac{I_{Rd=0} * I_{Rd=1}}{\tau_{eff}(d)} * \frac{1}{\frac{(1-d)*I_{Rd=1}}{\tau_{d=0}} + \frac{d*I_{Rd=0}}{\tau_{d=1}}}$$

Equation 7

The minimum and maximum boundary trip curves, A and B respectively, define the minimum and maximum levels (time vs. current) between the ultimate trip point and locked rotor current at which the protective device must trip. Therefore, the maximum boundary trip curve B generally under protects the circuit or device (does not trip soon enough) while the minimum boundary trip curve A generally over protects the circuit or device (trips too soon).

Figure 6:
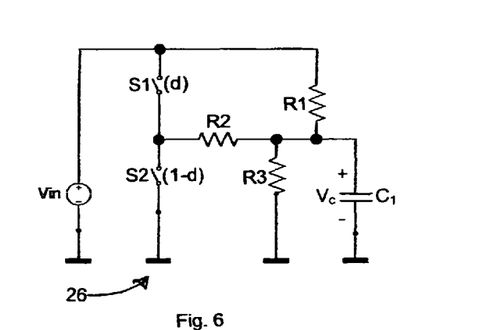

FIG. 6 illustrates a filter circuit generally indicated by reference number 26, implementing control over the horizontal scaling of a composed desirable trip curve such as modulated trip curve D. In filter circuit 26 two switching devices, S1 and S2 are modulated to compose the desired modulated trip curve D. To accomplish the modulation, S1 and S2 must always be in opposite positions (i.e. S1 must be OPEN when S2 is CLOSED). When S1 is OPEN (d=0) and S2 is CLOSED circuit 26 represents the maximum boundary curve B and When S1 is CLOSED (d=1) and S2 is OPEN circuit 26 represents the minimum boundary curve A. Using circuit 26, τ is maintained independent of the modulation variable d, to achieve an effective $I_{Reff}(d)$ as described by Equation 8 below.

$$\text{trip time}(d, I) = -\tau \times \ln\left(1 - \frac{I_{Reff}(d)}{I}\right),$$

$$I_{Reff}(d) = \left(\frac{1-d}{I_{Rd=0}} + \frac{d}{I_{Rd=1}}\right)^{-1}$$

Equation 8

Figure 7:
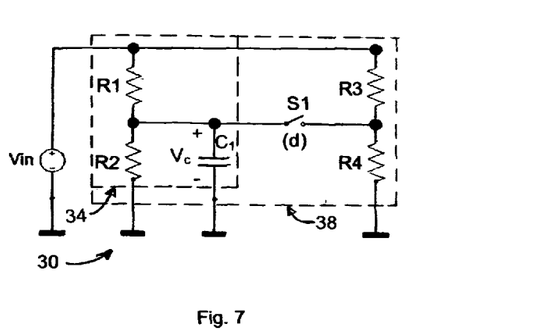

FIG. 7 illustrates a filter circuit generally indicated by reference number 30, implementing control over the vertical scaling of a composed desirable trip curve such as modulated trip curve D. I filter circuit 30 $I_R$ is maintained independent of the modulation variable d. In filter circuit 30 the resistance ratio of R1 to R2 must be the same as the resistance ratio of R3 to R4. In this implementation, modulation is achieved by selectively switching between a first circuit 34 representing the maximum boundary curve B and a second circuit 38 representing the minimum boundary curve A. For d=0 switch S1 is always open, the achieved value of τ is equal to the value for the slower trip time maximum boundary curve B, and the achieved curve is equal to the slower maximum boundary curve B. For d=1 switch S1 is always closed, and the achieved curve is equal to the fast minimum boundary curve A. For d between 0 and 1, the achieved curve is somewhere in between the maximum and minimum boundary curves, A and B respectively, such as the modulated desirable trip curve D in FIG. 1. Filter circuit 30 achieves a $\tau_{eff}(d)$ as described by Equation 9 below.

$$\text{trip time}(d, I) = -\tau_{eff}(d) \times \ln\left(1 - \frac{I_R}{I}\right),$$

$$\tau_{eff}(d) = \left(\frac{1-d}{\tau_{d=0}} - \frac{d}{\tau_{d=1}}\right)^{-1}$$

Equation 9

Figure 8:
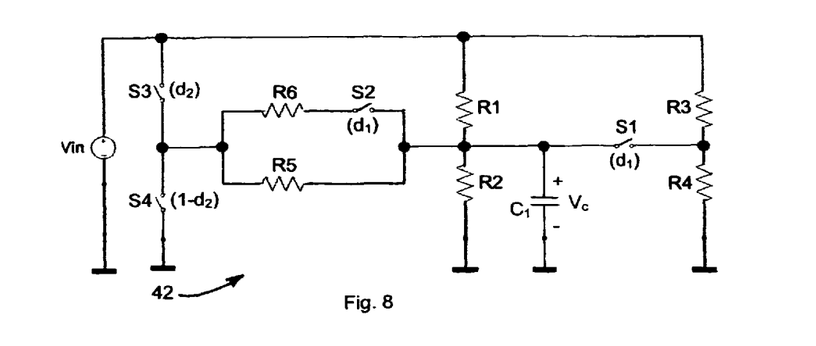

FIG. 8 illustrates a filter circuit, generally indicated by reference number 42, implementing separate control over the horizontal and vertical scaling of the composed desirable trip curve D. Compared to circuit 14 in FIG. 5, this simplifies the calculations required to compute the modulation function necessary to obtain a desirable trip curve C, however it requires two modulation variables, $d_1$ and $d_2$, and more components. In circuit 42, as in circuit 30 above, the resistance ratio of R1 to R2 must be the same as the resistance ratio of R3 to R4. Switching devices S1 and S2, which must operate together (both ON or both OFF), according to control modulation variable $d_1$ while switching devices S3 and S4, which must operate oppositely (S3 ON and S4 OFF), according to control modulation variable $d_2$. The resulting trip curve is defined by Equation 10 below.

$$\text{trip time}(d_1, d_2, I) = -\tau_{eff}(d_1) \times \ln\left(1 - \frac{I_{Reff}(d_2)}{I}\right),$$

Equation 10

-continued $$\tau_{\text{eff}}(d_1) = \left(\frac{1-d_1}{\tau(d_1=0)} - \frac{d_1}{\tau(d_1=1)}\right)^{-1},$$

$$I_{R\,\text{eff}}(d_2) = \left(\frac{1-d_2}{I_R(d_2=0)} - \frac{d_2}{I_R(d_2=1)}\right)$$

Figure 9:
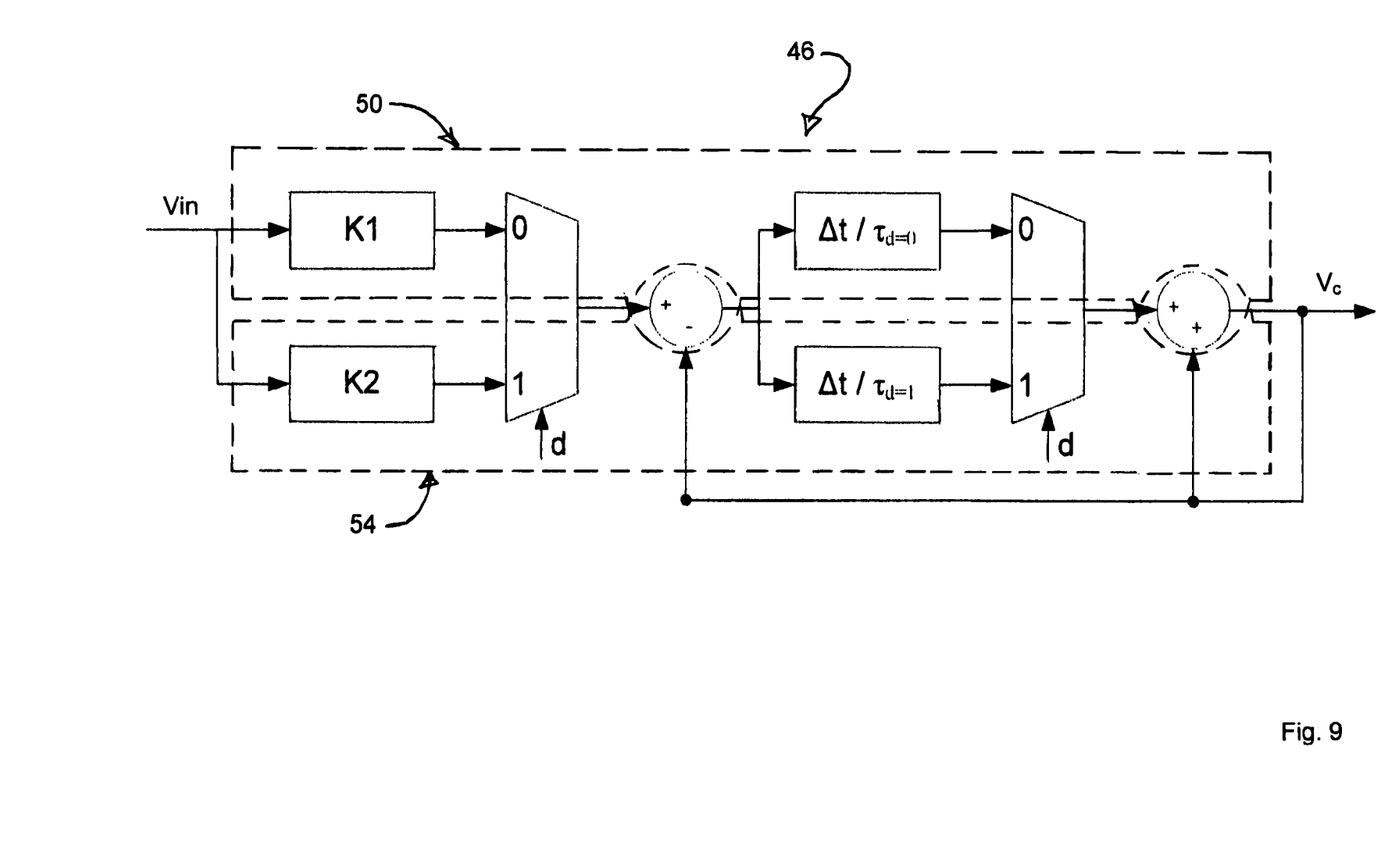
FIG. 9 illustrates a digital implementation of the filter circuit of FIG. 5.

FIG. 9 illustrates a digital implementation 46 of the analog filter circuit 14 shown in FIG. 5. In the digital implementation 46, the digital value of RC circuit 18 of FIG. 5 is represented by the box 50, representing the maximum boundary curve A, and the digital value of RC circuit 22 of FIG. 5, representing the minimum boundary curve B, is represented by the box 54. In digital implementation 46, K1 is equivalent to the digital value of R3/(R2+R3) in FIG. 5 and K2 is equivalent to the digital value of (R3‖R4)/(R1‖R2+R3‖R4) in FIG. 5; $\tau_{d=0}$ is equivalent to C*(R2‖R3) and $\tau_{d=1}$ is equivalent to C*(R1‖R2‖R3‖R4) where C=the digital value of capacitor $C_1$ in. The difference equation for the analog filter circuit 14 of FIG. 5 is shown in Equation 11 below.

$$V_C(t + \Delta t) = V_C(t) + [V_{in}(t) * K_1 - V_C(t)] * \frac{\Delta t}{\tau_{d=0}} * (1-d) + [V_{in}(t) * K_2 - V_C(t)] * \frac{\Delta t}{\tau_{d=1}} * (d) \quad \text{Equation 11}$$

The difference equation for the digital equivalent 46 of analog filter circuit 14 of FIG. 9 is shown in Equation 12 below. In this equation Vin[n] is the digital discrete time equivalent of Vin(t) and Vc[n] is the digital discrete time equivalent of Vc(t).

$$V_C[n+1] = V_C[n] + (Vin[n] * K_1 - V_C[n]) * \frac{\Delta t}{\tau_{d=0}} * (1-d) + (Vin[n] * K_2 - V_C[n]) * \frac{\Delta t}{\tau_{d=1}} * (d) \quad \text{Equation 12}$$

In all instances, the modulation duty cycle d must be lower than the RC time constants of the filters implemented to avoid introducing error to the trip time. Analysis of the thermal model level as a function of time shows that as the thermal model capacitor charges, the error introduced by the modulation averages to 0 for a constant I. The model will cross the trip threshold in slightly less or more time than ideally, depending upon which boundary curve RC circuit is charging the thermal model at the time. Increasing the modulation frequency decreases the maximum error caused by this. Practically speaking, the trip times of SSOLR trip curves are relatively high and this is not a significant source of error.

In each of the circuits described above, the element generating the modulation function is a microcontroller. The microcontroller must monitor the independent variables of the modulation functions implemented, and adjust the modulation according to some balance of tabulation and calculation. For some purposes the modulation functions can be entirely predetermined, such as composing a group of desired $I^2*t$ characteristic curves C over a range of I.

We claim:

1. A method of dynamically composing a desirable trip curve for an electrical protection device, comprising:
    monitoring one or more input values of a device to be protected;
    defining the desirable trip curve as a function of the one or more input values of the device;
    selecting at least one parameter of the desirable trip curve;
    defining the selected at least one parameter as a function of the one or more input values of the desirable trip curve;
    defining a minimum and a maximum value of the selected at least one parameter;
    configuring at least one electrical circuit representing at least one of a minimum boundary trip curve defined by the minimum value of the selected at least one parameter of the desirable trip curve or a maximum boundary trip curve defined by the maximum value of the selected at least one parameter of the desirable trip curve; and
    dynamically modulating the at least one electric circuit after the configuring by selectively connecting, for a determined duty cycle, the at least one electrical circuit to an input terminal of a switching device such that an output signal representing the desirable trip curve is provided at an output terminal of the switching device for the duration of the determined duty cycle, and disconnecting the at least one electrical circuit from the input terminal of the switching device after the duration of the determined duty cycle.

2. The method of claim 1, wherein the desirable trip curve lies between the minimum boundary trip curve and the maximum boundary trip curve.

3. The method of claim 1, wherein the monitored one or more input values comprise current, trip class or phase unbalance.

4. The method of claim 1, wherein the at least one parameter comprises $\tau$ or $I_R$.

5. The method of claim 1, wherein the duty cycle of the at least one switching device determines the shape of the desirable trip curve and the position of the desirable trip curve between the minimum boundary trip curve and the maximum boundary trip curve.

6. The method of claim 1, wherein operation of the input terminal of the at least one switching device between its selected positions and its determined duty cycle are controlled by a microprocessor.

7. The method of claim 1, wherein the electrical protection device receives operating power from the means for monitoring and has a low power budget for any operations other than its basic operation.

8. The method of claim 1, wherein modulating is accomplished by operating the at least one switching device between an ON position in which the at least one electrical circuit is connected to the switching device and an OFF position in which the at least one electrical circuit is not connected to the switching device.

9. The method of claim 1, wherein modulating is accomplished by operating the input terminal of the at least one switching device between the at least one electrical circuit representing the minimum boundary trip curve and the at least one electrical circuit representing the maximum boundary trip curve.

10. The method of claim 1, wherein the at least one electrical circuit is a filter circuit.

11. The method of claim 10, wherein the filter circuit is implemented digitally.

12. An apparatus for dynamically composing a desirable trip curve for an electrical protection device, comprising:
    means for monitoring at least one selected input parameter of a device to be protected;
    at least one electrical circuit representing one of a minimum boundary curve defined by a minimum value of a selected at least one parameter of the desirable trip curve or a maximum boundary trip curve defined by a maximum value of a selected at least one parameter of the desirable trip curve;

an output circuit receiving an electrical signal representing the desirable trip curve;

at least one switching device having an input terminal selectively connectable to the at least one electrical circuit and an output terminal electrically connected to the output circuit, and;

a switching device controller for selecting the at least one electrical circuit to connect to the at least one switching device and determining a duty cycle of the selected connection and disconnecting the at least one electrical circuit from the at least one switching device after the duration of the duty cycle such that the output circuit receives a modulated electrical signal representing the desirable trip curve.

13. The apparatus of claim 12, wherein the desirable trip curve lies between the minimum boundary trip curve and the maximum boundary trip curve.

14. The apparatus of claim 12, wherein the monitored one or more input values comprise current, trip class or phase unbalance.

15. The apparatus of claim 12, wherein the at least one parameter comprises τ or $I_R$.

16. The apparatus of claim 12, wherein the input terminal of the at least one electrical switch is a toggle that can selectively move between at least two positions for connecting to at least two electrical circuits.

17. The apparatus of claim 12, wherein the at least one electrical switching device has an ON position in which the at least one electrical circuit is connected to the at least one electrical switching device and an OFF position in which the at least one electrical circuit is not connected to the at least one electrical switching device.

18. The apparatus of claim 12, wherein the duty cycle of the at least one switching device determines the shape of the desirable trip curve and the position of the desirable trip curve between the minimum boundary trip curve and the maximum boundary trip curve.

19. The apparatus of claim 12, wherein operation of the input terminal of the at least one switching device between its selected positions and its determined duty cycle are controlled by a microprocessor.

20. The apparatus of claim 12, wherein the electrical protection device receives operating power from the means for monitoring and has a low power budget for any operations other than its basic operation.

21. The apparatus of claim 12, wherein the at least one electrical circuit is a filter circuit.

22. The method of claim 21, wherein the filter circuit is implemented digitally.

* * * * *